United States Patent
Zhao et al.

(10) Patent No.: US 8,566,849 B2
(45) Date of Patent: Oct. 22, 2013

(54) NAME SERVICE OBJECT CLUSTERING

(75) Inventors: Cuie Zhao, Singapore (SG);
Vishwanath Keshavamurthy Kasaravalli, Hayward, CA (US);
Vijaykumar Natarajan, Mountain View, CA (US)

(73) Assignee: Borland Software Corporation, Scotts Valley, CA (US)

( * ) Notice: Subject to any disclaimer, the term of this patent is extended or adjusted under 35 U.S.C. 154(b) by 1022 days.

(21) Appl. No.: 10/017,495

(22) Filed: Dec. 14, 2001

(65) Prior Publication Data
US 2002/0099970 A1    Jul. 25, 2002

Related U.S. Application Data

(60) Provisional application No. 60/255,651, filed on Dec. 14, 2000.

(51) Int. Cl.
*G06F 3/00* (2006.01)

(52) U.S. Cl.
USPC .......................................... 719/332; 718/105

(58) Field of Classification Search
USPC .................... 719/310, 332; 718/105
See application file for complete search history.

(56) References Cited

U.S. PATENT DOCUMENTS

| | | | |
|---|---|---|---|
| 5,452,447 A * | 9/1995 | Nelson et al. | 707/205 |
| 5,675,795 A * | 10/1997 | Rawson et al. | 713/2 |
| 5,742,759 A * | 4/1998 | Nessett et al. | 713/201 |
| 6,209,018 B1 * | 3/2001 | Ben-Shachar et al. | 718/105 |
| 6,606,643 B1 * | 8/2003 | Emens et al. | 709/203 |
| 7,043,731 B2 * | 5/2006 | Ramaswamy | 718/105 |

OTHER PUBLICATIONS

JR, Java Reflective Broker, Dec. 1997.*
Arno, Loading balancing example, Aug. 19, 1999.*
Geoffrey, The Gateway system: Uniform Web Based Access to Remote Resources, 1999.*
Fredrik Janson, CORBA vs. DCOM, Dec. 21, 2000.*

* cited by examiner

*Primary Examiner* — Lechi Truong
(74) *Attorney, Agent, or Firm* — DLA Piper LLP US (57) ABSTRACT

A naming service clustering method which permits naming service load balancing over a set of object references contained within the same cluster such that loads are equitably distributed among servers. Each cluster contains its own unique object binding table which contains object references which each typically represent a single server. Load balancing is performed using a load balance algorithm (e.g., Round Robin). The specific algorithm which is used to perform load balancing is specified upon creation of each naming service cluster. The method provides transparent load balancing among multiple object references in the same cluster. In addition, transparent "failover" among object references in the same cluster is achieved. The method also provides a dynamic addition of new object references into a cluster via binding, along with the dynamic removal of old object references from a cluster via unbinding.

22 Claims, 5 Drawing Sheets

NAME SERVICE OBJECT CLUSTERING

RELATED APPLICATIONS

The present patent application claims priority under 35. U.S.C. §119(e) from U.S. Provisional Patent Application Serial No. 60/255,651 Filed: Dec. 14, 2000 filed on Dec. 14, 2000, entitled Name Service Object Clustering, which is hereby incorporated herein by reference in its entirety.

BACKGROUND OF THE INVENTION

1. Field of the Invention

The present invention generally relates to the field of distributed object oriented computing and, more particularly, to a method for fault tolerance, load balance and "failover" of CORBA object servers via name service clustering.

2. Description of the Related Art

Recently, Common Object Request Broker Architecture (CORBA) has emerged as the de facto standard architecture for distributed object computing. This distributed object infrastructure enables organizations to build and deploy robust distributed object applications across the Internet and enterprise intranets.

Emerging application servers and Enterprise Java Bean (EJB) technology are being built on top of the pre-existing CORBA infrastructure. Remote Method Invocation (RMI) technology takes advantage of the capabilities of the Common Object Request Broker Architecture/Internet Inter Orb Protocol (CORBA/IIOP) infrastructure. As a result, fault tolerance, high availability and the load balancing capability of CORBA object servers become critically important due to the increased system capacity.

For example, a large number of requests to a CORBA object server can cause information bottlenecks at the server (i.e., a decrease in server capacity or a reduction in processing speed). As a result, a single CORBA object server can become the single-point of failure in a network. Moreover, since clients maybe long lived, unavailability of services from a server is unacceptable.

In the past, these problems have been solved by replicating the CORBA servers and performing a load balance by using a predefined algorithm among the replicas to select a specific object server. Load balancing across the servers can be performed with a variety of techniques, such as via a Round Robin directory and a naming service or a special CORBA object server which dispatches requests from clients to servers. However, substantial coding, redesign and reconfiguration of the server, which results in increased costs, is unavoidable.

Another solution to the prior problems involves redesigning and replicating the CORBA server, and statically configuring the replica servers such that each server object contains one profile for each replica server object. Upon failure of a server, client requests "failover" to a replica server. However, this configuration is not scalable, i.e., it is not applicable to different servers located in a large network. Once the redesign, replication, and configuration of the server is completed and implemented, it cannot be changed.

A further solution to the above mentioned problems comprises redesigning the client such that it captures failures and redirects requests to another server. However, this approach not only requires client code changes, but also requires that the client possess prior knowledge related to the existence of all the servers in the network. It is therefore apparent there is a need for a method for reducing failures associated with selecting a server located in a distributed object oriented computing environment.

SUMMARY OF THE INVENTION

The present invention is directed to a method for fault tolerance, load balance and "failover" of CORBA object servers via name service clustering. Name service clustering, such as implemented in "Visibroker Naming Service" (Trademark, Borland Software Corp, Scotts Valley, Calif.), permits naming service load balancing over a set of object references contained within the same cluster such that loads are equitably distributed among servers. Each cluster contains its own unique object binding table which contains object references that each typically represent a single server. Load balancing is performed using a load balance algorithm (e.g., Round Robin). The specific algorithm which is used to perform load balancing is specified upon creation of each naming service cluster.

When a client machine invokes a cluster located under a particular context or specific directory, i.e., "resolves," a load balance is performed to return an object reference which was previously bound to the cluster. The client machine may then communicate with the server associated with the object reference which was selected. Failover is provided by dynamically adding cluster components to resolved object references upon resolving each cluster.

In accordance with the invention, a method for fault tolerance, load balance and failover of CORBA object servers comprises the steps of: invoking a cluster contained in a context; performing a load balance to select an object server located in the invoked cluster; appending a cluster component to the invoked cluster to provide failover upon failure of the object server; forwarding a selected object reference to a client upon completion of the load balance; and communicating with a server associated with the selected object reference which was forwarded to the client.

In another embodiment of the invention a method for fault tolerance, load balance and failover of CORBA object servers comprises the steps of: setting a flag in a file to activate implicit clustering; invoking a cluster contained in a context having clusters; performing a load balance to select an object server located in the clusters; forwarding a selected object reference to a client upon completion of the load balance; and communicating with the server associated with the selected object reference which was forwarded to the client.

BRIEF DESCRIPTION OF THE DRAWINGS

The present invention may be more readily understood by one skilled in the art with reference being had to the following detailed description of the preferred embodiments thereof, taken in conjunction with the accompanying drawings wherein like elements are designated by identical reference numerals throughout the several views, and in which.

DESCRIPTION OF PREFERRED EMBODIMENTS

By way of overview and introduction, the invention is described in connection with a preferred embodiment, depicted in FIG. 3, in which load balancing is performed among servers 110 connected to the Internet 120, or other distributed computer network.

Generally, the Visibroker Naming Service™ permits the activation and deactivation of an implicit clustering feature and associates multiple object references with a single name. Activation of the implicit clustering feature may be accomplished using a flag located in a file, such as a configuration file, or the like. The clustering of object references in this manner becomes highly scalable because the object references may be dynamically added or removed from a cluster through cluster bind or unbind operations.

When implicit clustering is activated, object reference bindings using the same name are clustered together in the same cluster. A default load balance algorithm, such as Smart Round Robin, is used for implicit clustering. This algorithm may be changed at the discretion of the user.

If a call to a name within the clustered object references is invoked, the naming service load balances over the set of object references associated with the name and distributes the load accordingly. As a result, the need to recreate clusters is eliminated because the load balancing is performed among a common predetermined group of object reference binders.

Figure 1:
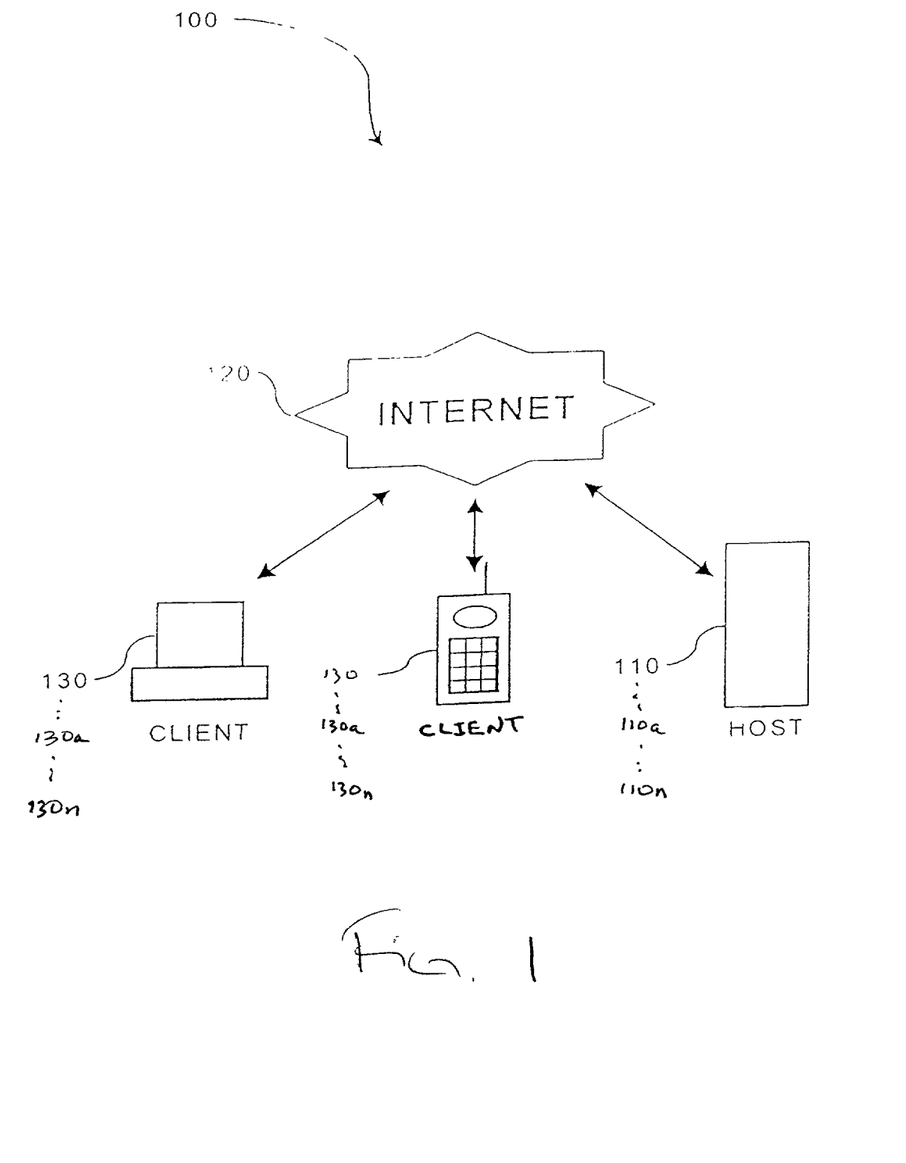
FIG. 1 is an illustration of a network arrangement of hardware components for implementing a method in accordance with a preferred embodiment of the invention.

FIG. 1 shows a network arrangement by which the preferred embodiment can be implemented. The network 100 includes host servers 110, 110a . . . 110n which provide content over the Internet 120 to a plurality of distributed users that access the host server through client machines 130, 130a . . . 130n. The content provided by the host server 110, 110a . . . 110n can be viewed by users through a web browser or other functionally equivalent software running at their respective client machines 130 (hereinafter, "browser").

The client machines or "client" 130 can assume a variety of forms, including a home computer, a personal digital assistant (PDA), a pager, an Internet compliant telephone, or other Internet compliant device. The client machines 130 and the host server 110 communicate with one another in a conventional manner over a communication link through a distributed computer network such as the Internet 120. In lieu of the Internet, communications can be through an Intranet or Extranet or between a host computer and a kiosk located nearby, as understood by those of skill in the art.

Figure 2:
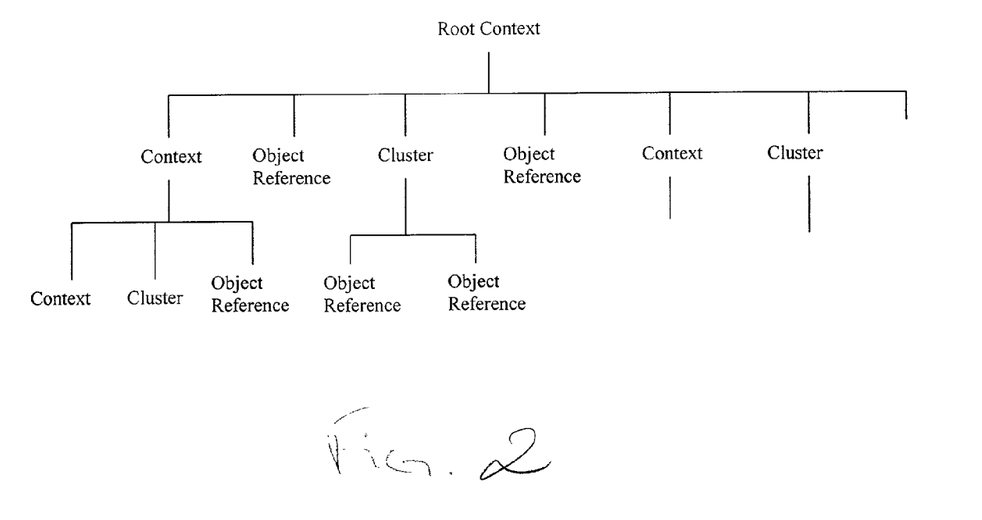
FIG. 2 is an exemplary illustration of a naming graph comprising an object management group in a distributed computing system.

FIG. 2 is an exemplary illustration of a naming graph comprising an object management group in a distributed computing system. The starting point for the construction of such a graph is the "Root Context" of the object management group. The Root context contains object name bindings. Such a repository of object name bindings is called a CosNaming Service, and permits a client to locate an object using a logical name which is bound within the repository.

Visibroker Naming Service™ is an implementation of OMG CosNaming Service. In addition, Visibroker Naming Service™ includes a feature called clustering which groups objects within a cluster to provide scalability and high availability to applications via load balancing and alternative server selection, i.e., "failover", upon server failures.

A Visibroker Naming Service™ cluster is a placeholder for a set of functionally exchangeable objects. A naming service cluster differs from the CosNaming context in that the CosNaming context is a directory that may contain sub-contexts, object references, and service clusters, while a service cluster may contain only object references. Each object reference shown in FIG. 2 will contain the server's Host Name, IP Address, Port No., and the like.

Figure 3:
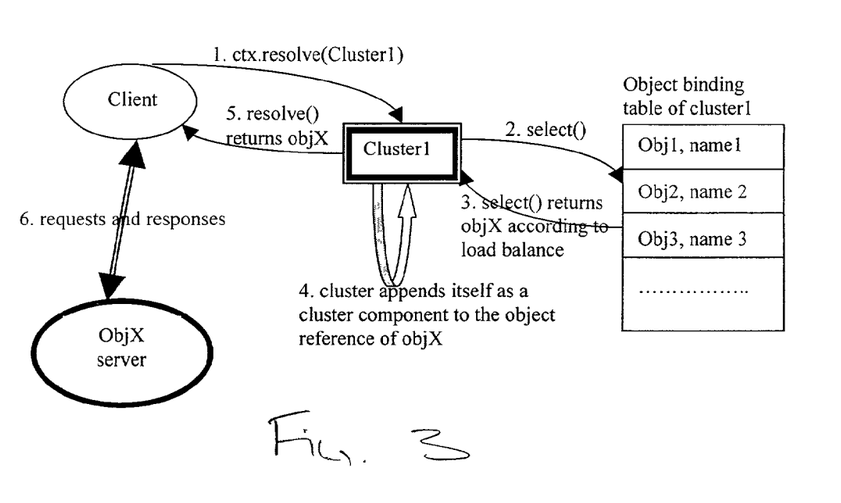
FIG. 3 is an illustration of a server replication operation in accordance with the preferred embodiment of the invention.

FIG. 3 is an illustration of a server replication operation in accordance with the preferred embodiment of the invention. Visibroker Naming Service™ clustering permits naming service load balancing over a set of object references contained within the same cluster such that loads are equitably distributed among servers. Each cluster contains its own unique object binding table which contains object references which each typically represent a single server. Load balancing is performed using a load balance algorithm (e.g., Round Robin). The specific algorithm which is used to perform load balancing in a given implementation is not critical to the invention, but is specified upon creation of each naming service cluster.

When a client invokes a cluster located under a particular context or specific directory (1), i.e., "resolves," a load balance (2) is performed to return an object reference (3) which was previously bound to the cluster. The client may then communicate with the server associated with the object reference which was selected.

As shown in FIG. 3, failover is provided by dynamically adding cluster components to resolved object references upon resolving each cluster (4). In other words, upon resolving each cluster, a cluster component which is a part of an object reference of an object is created. Each cluster component provides to a client object resource broker (ORB) information which permits the client ORB to access the cluster object located in the name service to which this object is bound. Upon the occurrence of a failure, this information permits the client ORB to contact the cluster object to obtain another object in the same cluster to which the client ORB can then failover to. If an object reference fails during processing, the particular object reference binding associated with the specific object reference in the cluster becomes stale.

When a client invokes an invocation to a specific server, the connection to the server is accomplished using a process called binding. In order for the client to communicate with the server, it must bind with the server using the IP Address and Port No. contained in a specific object reference. Here, a binding is performed by using an object reference and performing the necessary steps to derive a concrete connection to a specific process that implements the functionality represented by that object reference. User participation in the binding process is accomplished via a "binding interceptor" which is a Java class that the user may implement as desired. Each class comprises methods of differing relevancies which are used to indicate the binding status (i.e., Bind, Bind_Succeeded, Bind_Failed, and Exception_Occurred). A "Bind" is performed by using an object reference and performing the steps necessary to derive a concrete connection to a specific process which implements the functionality represented by that object reference. Here, a Bind_Succeeded is an indication that a connection was achieved, a Bind_Failed is an indication that a connection was not established and an Exception_Occurred represents an indeterminate state between Bind_Succeeded and Bind_Failed.

Each time a client attempts to establish a connection with a server object, a bind method is called. In accordance with the invention, if a user is provided with the knowledge that bind interceptors may be used, the user will be provided with a class containing the most relevant methods, preferably the three most relevant methods. In the preferred embodiment, the most relevant methods are Bind, Bind_Succeeded and Bind_Failed. The user then writes (specifies) the class such that the class subsequently contains the most relevant methods. When the connection to the server is being established, the user code is called (i.e., a bind interceptor is used). The bind interceptor provides a user with an option to select an alternative server in the instance where the system was operating adequately and then fails. For example, if a returned bind interceptor contains a Bind_Failed method, the user is presented with an opportunity to choose to connect to another server.

When an attempt to send a request to the stale server is made, the client associated with the stale object reference will transparently intercept the cluster component using the binding interceptor. The interceptor will then invoke the cluster's select operation (i.e., its load balancing algorithm) to select and return to the client another object reference in the same cluster. Communication is then established between the client and the server of the newly returned object reference. As a result, the failover to one of the object references in the same cluster is transparently achieved. The failed object reference is thereafter marked as "suspect." In an embodiment, the stale object reference is automatically removed from the cluster based on a user established preference.

In an aspect of the invention, the Visibroker Naming Service™ permits the activation and deactivation of an implicit clustering feature and associates multiple object references with a single name. Activation of the implicit clustering feature may be accomplished using a flag located in a file, such as a configuration file, or the like. The clustering of object references in this manner becomes highly scalable because the object references may be dynamically added or removed from a cluster through cluster bind or unbind operations.

Figure 4:
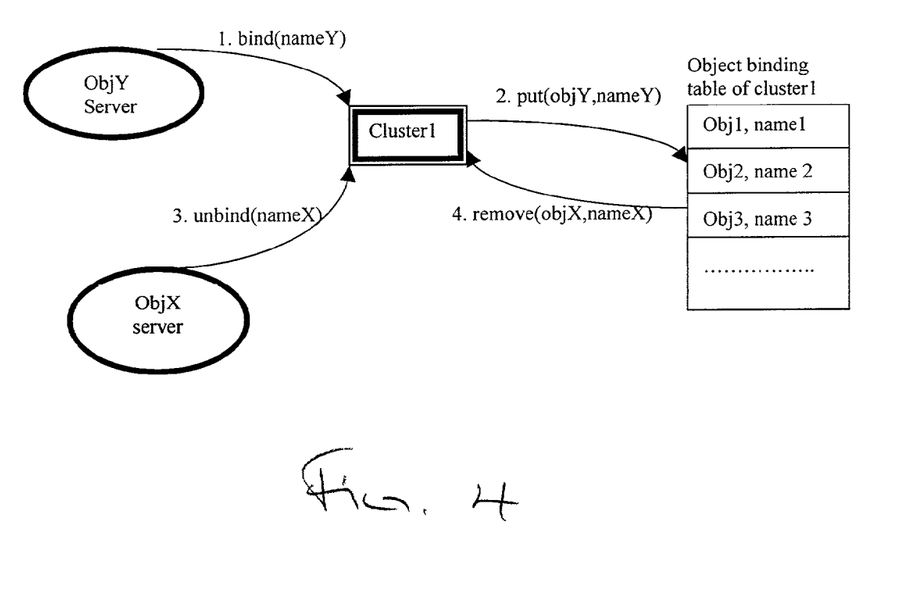
FIG. 4 is an illustration of a dynamic bind and unbind operation of cluster objects in accordance with the preferred embodiment of the invention.

FIG. 4 is an illustration of a dynamic bind and unbind operation of cluster objects in accordance with the preferred embodiment of the invention. When implicit clustering is activated, object reference bindings using the same name are clustered together in the same cluster. A default load balance algorithm, such as Smart Round Robin, is used for implicit clustering. This algorithm may be changed at the discretion of the user.

When a call to a name within the clustered object references is invoked (1), the naming service load balances (2) over the set of object references associated with the name and distributes the load accordingly (4). As a result, the need to recreate clusters is eliminated because the load balancing is performed among a common group of object reference binders.

Figure 5:
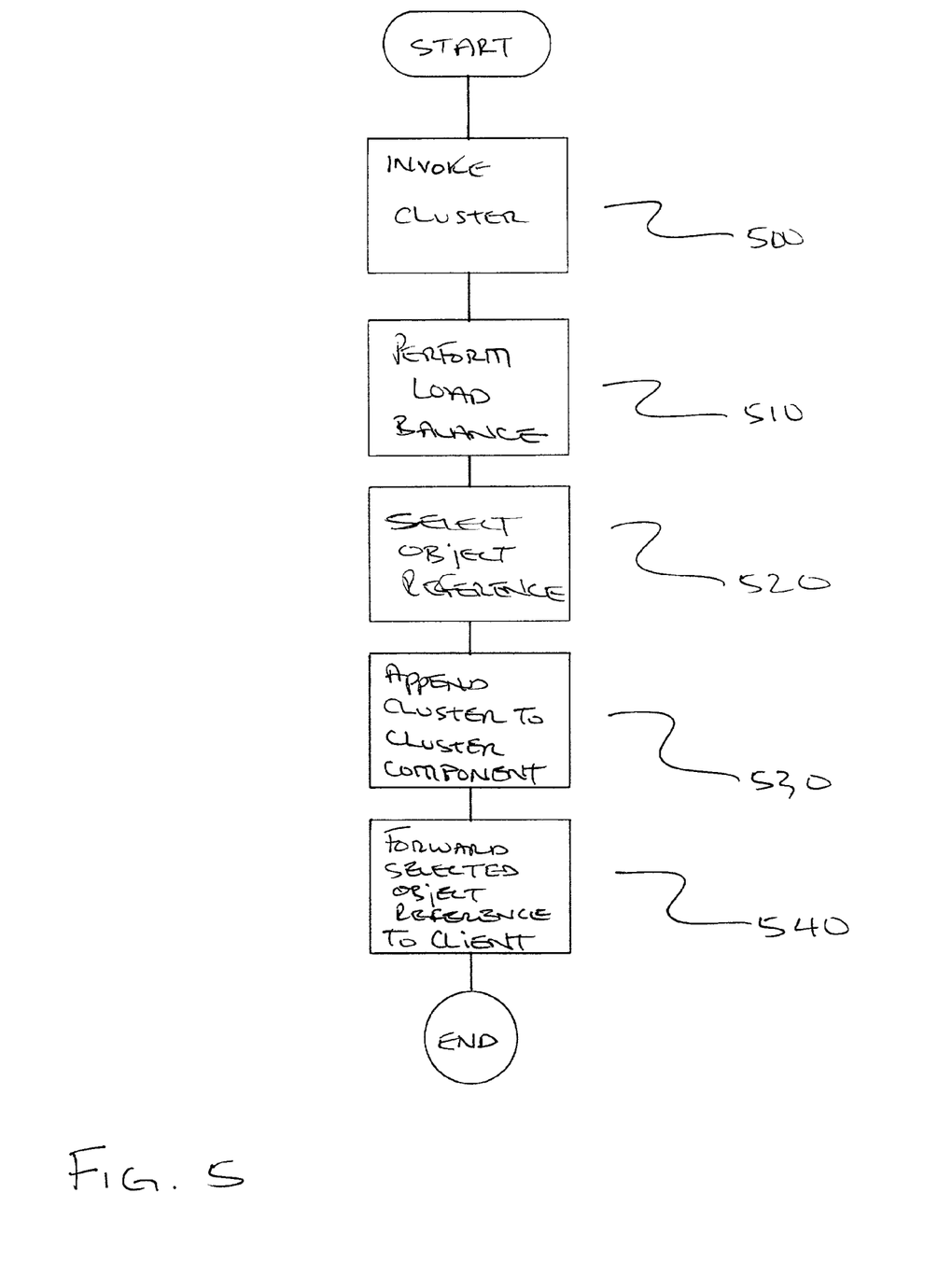
FIG. 5 is a flow chart of a method for load balancing in accordance with the preferred embodiment of the invention.

FIG. 5 is a flow chart of a method for load balancing in accordance with the preferred embodiment of the invention. In accordance with the preferred embodiment, the method is implemented when a client invokes a cluster located under a particular context or specific directory, as indicated in step 500. A load balance is performed to return an object reference which is bound to the cluster, as indicated in step 510. Load balancing is performed using a load balance algorithm (e.g., Round Robin). The specific algorithm which is used to perform load balancing is specified upon creation of each naming service cluster. An object reference is forwarded to the cluster, as indicated in step 520. Next, cluster components are dynamically added to resolved object references subsequent to load balancing each cluster to provide failover, as indicated in step 530. Failover is provided in the manner discussed previously. Next, the client communicates with the server associated with the object reference which was selected and forwarded to the client, as indicated in step 540.

Figure 6:
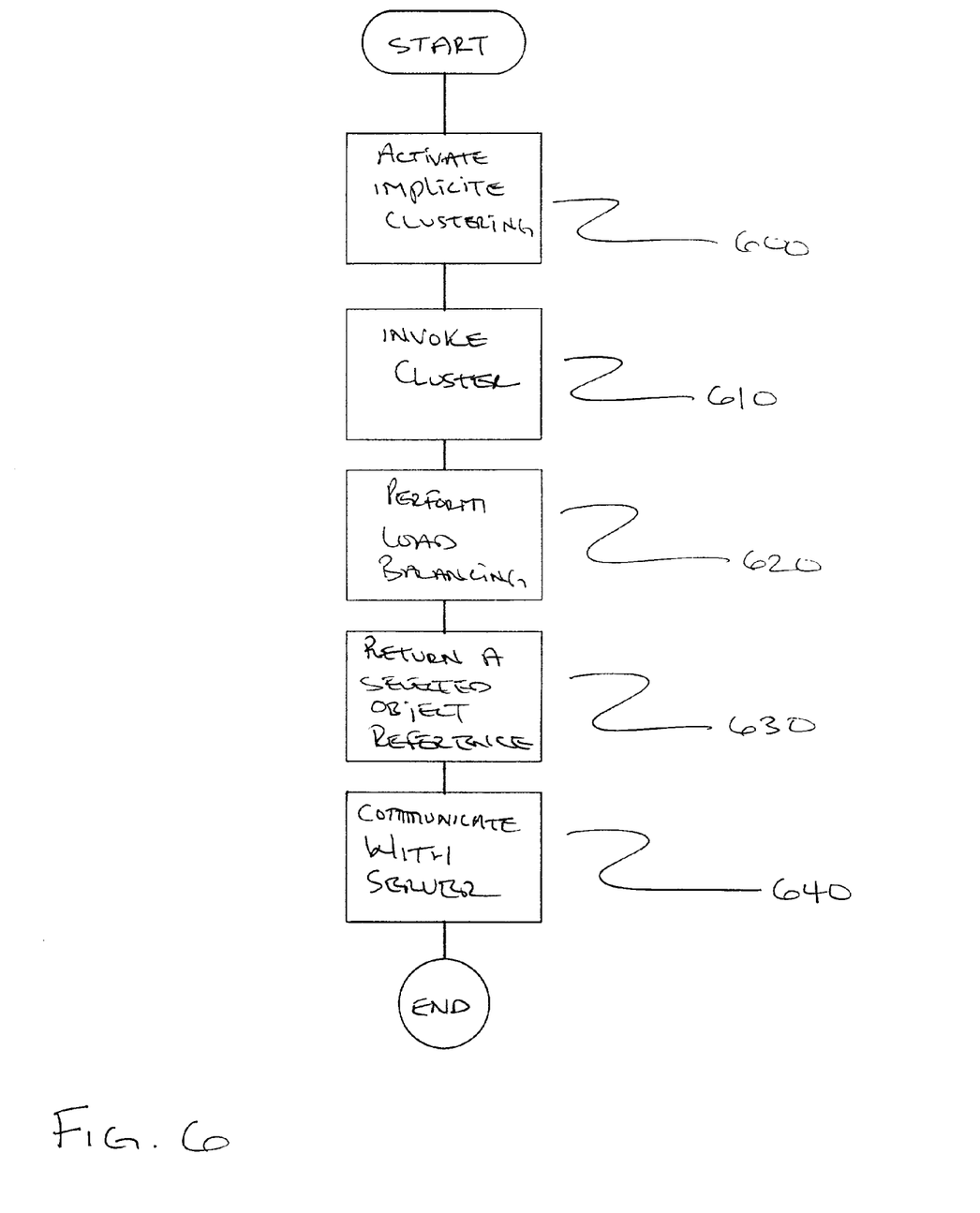
FIG. 6 is a flow chart of a method for dynamic object clustering in accordance with the preferred embodiment of the invention.

FIG. 6 is a flow chart illustrating dynamic bind and unbind operations of cluster objects in accordance with the preferred embodiment of the invention. In accordance with this embodiment, the method is implemented when implicit clustering is activated, as indicated in step 600. Next, a cluster containing the clustered object reference bindings using the same name is invoked, as indicated in step 610. Load balancing is performed on the clustered object references using a default load balance algorithm, as indicated in step 620. This algorithm may be changed at the discretion of the user, e.g., from a Round Robin algorithm to a different algorithm. A selected object reference based on the load balance is returned upon completion of load balancing, as indicated in step 630. Next, the client communicates with the server associated with the object reference which was selected and forward to the client, as indicated in step 640.

Methods in accordance with the invention permit transparent load balancing among multiple object references in the same cluster to be achieved. In addition, transparent failover among object references in the same cluster is provided. Method according to the invention also provide a dynamic addition of new object references into a cluster via binding, along with the dynamic removal of old object references from a cluster via unbinding. Morever, automatic detection of stale object references in a cluster and clean up based on the preference of a client is achieved. Further, such methods provide a consistent application of the load balancing algorithms per cluster. New load balancing algorithms may be up-loaded to the system as required. The method eliminates the need to change the client code or server code such that manual configurations are not required.

While the invention has been particularly shown and described with reference to a preferred embodiment thereof, it will be understood by those skilled in the art that various changes in form and details may be made therein without departing from the spirit and scope of the invention.

What is claimed is:

1. A computer implemented method for fault tolerance, load balance and failover that occurs transparently to a Common Object Request Broker Architecture (CORBA) client while resolving a CORBA object server, comprising:

establishing name service clusters for object servers which each contain a unique object binding table that contains object server references;

specifying a load balance algorithm to perform load balancing of object references contained within the common group of object reference binders;

clustering together object reference bindings having identical names into common clusters such that a common group of object reference binding servers is created;

in response to a request from a client that invokes a cluster, performing a load balance by having a name service select an object server located in an invoked cluster;

appending a cluster component to the invoked cluster to provide failover upon failure of the object server;

forwarding a selected object reference to the client upon completion of the load balance; and permitting the client to communicate with the object server associated with the selected object reference which was forwarded to the client, wherein a fault tolerance, a pre-determined load balance and the failover are performed transparently to the CORBA client while resolving the CORBA object server.

2. The method of claim 1, further comprising:
  binding to the object server using an IP Address and a port number contained in the selected object reference.
3. The method of claim 1, further comprising:
  specifying a load balance algorithm upon establishing the name service clusters to perform name service load balancing of object reference contained within the clusters.
4. The method of claim 1, wherein the load balance balancing is performed based on a predetermined method.
5. The method of claim 1, wherein the load balance is performed based on a predetermined method.
6. The method of claim 5, wherein the predetermined method is a Round Robin load balancing algorithm.
7. The method of claim 1, wherein the object binding table of each cluster contains object references; and
  wherein each object reference represents a single object server.
8. A computer implemented method for fault tolerance, load balance and failover that occurs transparently to a Common Object Request Broker Architecture (CORBA) client while resolving a CORBA object server, comprising:
  establishing name service clusters for object servers which each contain a unique object binding table that contains object server references;
  in response to a request from a client that invokes a cluster, performing a load balance by having a name service select an object server located in an invoked cluster;
  appending a cluster component to the invoked cluster to provide failover upon failure of the object server;
  forwarding a selected object reference to the client upon completion of the load balance;
  permitting the client to communicate with the object server associated with the selected object reference which was forwarded to the client by binding to the object server using an IP Address and a port number contained in the selected object reference, wherein a fault tolerance, the load balance, and the failover are performed transparently to the CORBA client while resolving the CORBA object server;
  providing a user with a class having predetermined methods if bind interceptors are in use; and
  specifying the class such that the class contains most predetermined methods, said specifying being performed at a discretion of the user.
9. The method of claim 8, further comprising:
  checking the bind interceptors if the object fails; and
  selecting an alternative server if a bind interceptor contains a predetermined method; said selection being performed by the user upon entry of a predetermined method by the user.
10. The method of claim 9, further comprising:
  intercepting a cluster component of the object server which failed based on the bind interceptor;
  invoking a load balance algorithm of the cluster via the bind interceptor to select and return a new object reference located in the cluster to the client;
  established communications with the client and an object server of the new object reference; and
  marking a failed object server to indicate failure thereof.
11. The method of claim 10, further comprising:
  removing the marked failed object server from the cluster.
12. The method of claim 9, wherein the predetermined method is bind_failed.
13. The method of claim 9, wherein the predetermined method is a Round Robin load balancing algorithm.
14. The method of claim 8, wherein the predetermined methods are one of bind, bind_succeeded and bind failed.
15. A computer implemented system for fault tolerance, load balance and failover that occurs transparently to a Common Object Request Broker Architecture (CORBA) client while resolving a CORBA object server, comprising:
  a processor comprising a memory and a processing circuit configured for:
  establishing name service clusters for object servers which each contain a unique object binding table that contains object server references;
  clustering together object reference bindings having identical names into common clusters such that a common group of object reference binding servers is created; and
  specifying a predetermined load balance algorithm to perform load balancing of object references contained within the common group of group of object reference binders;
  in response to a request from a client that invokes a cluster, performing a load balance by having a name service select an object server located in in an invoked cluster;
  appending a cluster component to the invoked cluster to provide failover upon failure of the object server;
  forwarding a selected object reference to a client upon completion of the load balance;
  permitting the client to communicate with the object server associated with the selected object reference which was forwarded to the client, wherein a fault tolerance, the load balance and the failover are performed transparently to the CORBA client while resolving the CORBA object server.
16. The system of claim 15, wherein the file comprises a configuration file.
17. The system of claim 15, wherein the processing circuit is further configured for:
  binding to the server using an IP Address and port number contained in the specific object reference.
18. The system of claim 15, wherein said load balancing is performed based on a predetermined method.
19. The method of claim 18, wherein the predetermined method is a Smart Round Robin load balancing algorithm.
20. The method of claim 15, wherein initially the load balance algorithm is a Smart Round Robin.
21. A computer implemented system for load balancing that occurs transparently to a Common Object Request Broker Architecture (CORBA) client while resolving a CORBA object server, comprising:
  a processor compromising a memory and a processing circuit configured for:
  establishing name service clusters for object servers which each contain a unique object binding table that contains object server references;
  in response to a request from a client that invokes a cluster, a name service for the cluster performs a load balance to select an object server located in an invoked cluster which can handle the request;
  appending a cluster component to the invoked cluster to provide failover upon failure of the object server;
  forwarding a selected object reference to the client upon completion of the load balance; and
  permitting the client to communicate with the object server associated with the selected object reference which was forwarded to the client by binding to the object server using an IP address and a port number contained in the selected, wherein a fault tolerance, the load balance, and the failover are performed transparently to the CORBA client while resolving the CORBA object server;

providing the user with a class having relevant methods if bind interceptors are in use; and specifying the class such that the class contains most relevant methods, said specifying being performed at a discretion of the user.

22. The system of claim 21, wherein the processing circuit is further configured for:

checking the bind interceptors if the object fails;

selecting an alternative server if a bind interceptor contains a predetermined method; said selection being performed by the user upon entry of a predetermined method by the user;

intercepting a cluster component of the object server which failed based on the bind interceptor;

invoking a load balance algorithm of the cluster via the bind interceptor to select and return a new object reference located in the cluster to the client;

established communications with the client and an object server of the new object reference; and marking a failed object server to indicate failure thereof.

* * * * *